United States Patent
Zhou

(10) Patent No.: US 11,729,615 B2
(45) Date of Patent: Aug. 15, 2023

(54) INTERNET OF THINGS COMMUNICATION METHOD, APPARATUS, AND SYSTEM

(71) Applicant: HUAWEI CLOUD COMPUTING TECHNOLOGIES CO., LTD., Guizhou (CN)

(72) Inventor: Kai Zhou, Shenzhen (CN)

(73) Assignee: HUAWEI CLOUD COMPUTING TECHNOLOGIES CO., LTD., Guizhou (CN)

(*) Notice: Subject to any disclaimer, the term of this patent is extended or adjusted under 35 U.S.C. 154(b) by 416 days.

(21) Appl. No.: 16/600,914

(22) Filed: Oct. 14, 2019

(65) Prior Publication Data

US 2020/0045546 A1 Feb. 6, 2020

Related U.S. Application Data

(63) Continuation of application No. PCT/CN2018/111680, filed on Oct. 24, 2018.

(30) Foreign Application Priority Data

Nov. 3, 2017 (CN) .......................... 201711070301.1

(51) Int. Cl.
*H04W 12/06* (2021.01)
*H04W 76/10* (2018.01)
(Continued)

(52) U.S. Cl.
CPC ......... *H04W 12/06* (2013.01); *H04L 63/0876* (2013.01); *H04L 67/12* (2013.01);
(Continued)

(58) Field of Classification Search
CPC ....... H04W 12/06; H04W 8/18; H04W 12/50; H04W 60/00; H04W 76/10; H04W 88/16;
(Continued)

(56) References Cited

U.S. PATENT DOCUMENTS

2007/0249342 A1* 10/2007 Huang .................... H04L 67/02
455/435.1
2010/0124228 A1* 5/2010 Tinnakornsrisuphap ..................
H04W 92/02
709/230

(Continued)

FOREIGN PATENT DOCUMENTS

CN 1802016 A 7/2006
CN 101951597 A 1/2011
(Continued)

OTHER PUBLICATIONS

S2-124171, Huawei, et al., "Use Push Proxy to reduce heartbeat/keep-alive data of Applications," SA WG2 Meeting #93, Oct. 8-12, 2012, Sofia, Bulgaria, 2 pages.
(Continued)

*Primary Examiner* — Khalid M Almaghayreh
(74) *Attorney, Agent, or Firm* — Conley Rose, P.C.

(57) ABSTRACT

An internet of things device including an interworking gateway. The interworking gateway serves as an agent of an internet of things server in an operator network, replaces the internet of things server to register and authenticate an internet of things terminal, and forwards a message between the internet of things server and the internet of things terminal. The interworking gateway is located in a same IP subnet or private network as a packet data network gateway or a user plane device in a telecommunications network. Based on an Internet Protocol (IP) address of the internet of things terminal, the interworking gateway may determine validity of the internet of things terminal and directly address the internet of things terminal.

24 Claims, 5 Drawing Sheets

(51) Int. Cl.
    *H04L 9/40*     (2022.01)
    *H04L 67/12*     (2022.01)
    *H04W 8/18*     (2009.01)
    *H04W 60/00*     (2009.01)
    *H04W 12/50*     (2021.01)
    *H04W 88/16*     (2009.01)

(52) U.S. Cl.
CPC .............. *H04W 8/18* (2013.01); *H04W 12/50* (2021.01); *H04W 60/00* (2013.01); *H04W 76/10* (2018.02); *H04W 88/16* (2013.01)

(58) Field of Classification Search
CPC ... H04W 12/72; H04W 4/70; H04W 52/0206; H04W 4/005; H04W 4/008; H04L 63/0876; H04L 63/0884; H04L 67/12; H04L 67/2809; H04L 67/303; H04L 61/6054; H04L 61/2514; H04L 43/10; H04L 12/66; H04L 12/2803; H04L 12/2838; H04L 61/20; Y02D 30/70
See application file for complete search history.

(56) References Cited

U.S. PATENT DOCUMENTS

| | | | | |
|---|---|---|---|---|
| 2010/0318665 | A1* | 12/2010 | Demmer | H04L 69/163 709/227 |
| 2012/0047551 | A1* | 2/2012 | Pattar | H04W 4/70 726/1 |
| 2012/0144189 | A1* | 6/2012 | Zhong | H04L 63/0892 713/155 |
| 2013/0332627 | A1* | 12/2013 | Skog | H04W 76/25 709/244 |
| 2015/0229605 | A1* | 8/2015 | Wu | H04L 67/10 726/12 |
| 2016/0100014 | A1 | 4/2016 | Hsieh et al. | |
| 2017/0041287 | A1* | 2/2017 | Pak | H04L 67/10 |
| 2017/0272121 | A1* | 9/2017 | Dao | H04W 4/70 |
| 2018/0007551 | A1* | 1/2018 | Wang | H04L 69/22 |
| 2018/0054490 | A1* | 2/2018 | Wadhwa | G08G 1/0129 |
| 2018/0103371 | A1* | 4/2018 | Zimmerman | H04W 12/0431 |
| 2018/0309786 | A1* | 10/2018 | Apelewicz | H04W 12/04 |
| 2018/0338280 | A1* | 11/2018 | Zakaria | H04W 4/80 |
| 2018/0367571 | A1* | 12/2018 | Verma | H04L 63/1433 |
| 2019/0052476 | A1 | 2/2019 | Shu et al. | |
| 2019/0068592 | A1* | 2/2019 | Mattela | H04L 63/0876 |
| 2019/0239068 | A1* | 8/2019 | Mudulodu | H04L 9/3226 |
| 2019/0379739 | A1* | 12/2019 | Schulz | H04W 4/70 |
| 2020/0021586 | A1* | 1/2020 | Schmidt | H04W 12/66 |
| 2020/0059976 | A1* | 2/2020 | Bhatia | H04W 8/005 |
| 2022/0141262 | A1* | 5/2022 | Seed | H04L 65/1073 709/223 |

FOREIGN PATENT DOCUMENTS

| | | |
|---|---|---|
| CN | 103685210 A | 3/2014 |
| CN | 104363207 A | 2/2015 |
| EP | 1816825 A1 | 8/2007 |
| JP | 2013081035 A | 5/2013 |
| JP | 2013516149 A | 5/2013 |
| WO | 2012115551 A1 | 8/2012 |
| WO | 2015106595 A1 | 7/2015 |
| WO | 2017106258 A1 | 6/2017 |
| WO | 2017129124 A1 | 8/2017 |
| WO | 2017168209 A1 | 10/2017 |

OTHER PUBLICATIONS

Machine Translation and Abstract of Chinese Publication No. CN101951597, Jan. 19, 2011, 14 pages.
Foreign Communication From a Counterpart Application, PCT Application No. PCT/CN2018/111680, English Translation of International Search Report dated Jan. 18, 2019, 2 pages.

* cited by examiner

INTERNET OF THINGS COMMUNICATION METHOD, APPARATUS, AND SYSTEM

CROSS-REFERENCE TO RELATED APPLICATIONS

This application is a continuation of International Patent Application No. PCT/CN2018/111680, filed on Oct. 24, 2018, which claims priority to Chinese Patent Application No. 201711070301.1, filed on Nov. 3, 2017. The disclosures of the aforementioned applications are hereby incorporated by reference in their entireties.

TECHNICAL FIELD

This application relates to the internet of things field, and in particular, to a method, an apparatus, and a system for communication between an internet of things terminal and an internet of things server in the internet of things field.

BACKGROUND

In an internet of things system, there are a large quantity of internet of things terminals with a limited capability or a limited resource. Due to small memory or limited power supply, and the like, these terminals are generally characterized by small traffic, a low rate, low power consumption, low costs, and the like. A typical internet of things terminal with a limited capability includes a narrow band Internet of things (NB-IoT) terminal, for example, a device such as a water meter, a watt-hour meter, or a gas meter into which an NB-IoT chip is inserted. Because the internet of things terminals with a limited capability cannot support performance consumption that is caused by an authentication scheme (such as Datagram Transport Layer Security (DTLS)) with a complex procedure, an internet of things platform or an internet of things server generally authenticates the terminals in a registration procedure using an application layer protocol, for example, a lightweight (LW) machine-to-machine (LWM2M) protocol. However, in the LWM2M protocol, the internet of things platform or server can only authenticate a terminal based on a node identifier (NodeID) that is reported by the terminal in a registration request. This NodeID is generally regular and may be forged by another malicious terminal. Therefore, a registration method needs to be provided, to meet a requirement of low power consumption of the internet of things terminal, and ensure that the internet of things platform or server performs security authentication on the internet of things terminal.

SUMMARY

This application provides a new internet of things device, namely, an interworking gateway. The interworking gateway is connected to a core network, for example, the interworking gateway is connected to a packet data network gateway or a user plane device in the core network. The interworking gateway is located in a same Internet Protocol (IP) subnet or private network as the packet data network gateway or the user plane device in the core network; that is, the interworking gateway may directly interwork with the packet data network gateway or the user plane device without IP address translation. In addition to a short connection, the interworking gateway and an internet of things server may maintain at least one reliable transmission path for communication. The interworking gateway serves as an agent of the internet of things server in an operator network, replaces the internet of things server to register and authenticate an internet of things terminal, and forwards a message between the internet of things server and the internet of things terminal. After the internet of things terminal is attached to a telecommunications network, an IP address that is allocated by the telecommunications network to the internet of things terminal is an IP address of an IP subnet or a private network in which a packet data network gateway or a user plane device in the telecommunications network is located. Because the interworking gateway is located in a same IP subnet or private network as the packet data network gateway or the user plane device in the telecommunications network, the interworking gateway may obtain a real IP address (namely, an IP address for which no NAT translation is performed) of the internet of things terminal. Based on the IP address of the internet of things terminal, the interworking gateway may determine validity of the internet of things terminal and directly address the internet of things terminal. Therefore, no additional heartbeat message needs to be sent between the interworking gateway and the internet of things terminal, thereby reducing power consumption and performance consumption of the internet of things terminal. In addition, when the interworking gateway communicates with the internet of things server using a reliable transmission path, security of communication between the internet of things terminal and the internet of things server can be ensured.

According to a first aspect, this application provides an internet of things communication method, including: receiving, by an interworking gateway, a registration request that is sent by a core network gateway and that is from an internet of things terminal, where the registration request includes an address and a device identifier that are of the internet of things terminal, and the interworking gateway and the core network gateway are located in a same IP subnet or private network; and after successfully authenticating the internet of things terminal, sending, by the interworking gateway, the registration request to an internet of things server. In some implementations, the interworking gateway authenticates the internet of things device based on the address and the device identifier that are of the internet of things terminal and that are included in the registration request. If the address and the device identifier that are included in the registration request are the same as an address and a device identifier that are locally recorded in the interworking gateway, the internet of things terminal is successfully authenticated. For example, the interworking gateway may query, in a local record based on the address in the registration request, a device identifier corresponding to the address; and if the device identifier locally recorded in the interworking gateway is the same as the device identifier in the registration request, the internet of things terminal is successfully authenticated. Alternatively, the interworking gateway may query a corresponding address in a local record based on the device identifier in the registration request. If the address locally recorded in the interworking gateway is the same as the address in the registration request, the internet of things terminal is successfully authenticated.

In a possible embodiment, before the interworking gateway receives the registration request that is sent by the core network gateway and that is from the internet of things terminal, when the internet of things terminal is attached to a core network, the core network gateway notifies the interworking gateway that the internet of things terminal has been attached, and notifies the interworking gateway of the address and an international mobile subscriber identity (IMSI) that are of the internet of things terminal. When the internet of things terminal registers an account, the internet of things server stores the device identifier and the IMSI that are of the internet of things terminal. Therefore, after receiving the address and the IMSI that are of the internet of things terminal, the interworking gateway may query the internet of things server for the device identifier of the internet of things terminal based on the IMSI, that is, the interworking gateway obtains, from the core network and the internet of things server, a correspondence among the address, the IMSI, and the device identifier that are of the internet of things terminal. Therefore, the interworking gateway may authenticate the internet of things device based on the address and the device identifier that are of the internet of things terminal and that are included in the registration request.

In a possible embodiment, after the interworking gateway obtains a correspondence between the address and the device identifier that are of the internet of things terminal, the interworking gateway may forward, to the internet of things terminal, messages that are from the internet of things server and that include the device identifier of the internet of things terminal. The messages that may be forwarded by the interworking gateway include a registration response, a bootstrap message, and the like.

In a possible embodiment, the registration response that is sent by the internet of things server to the interworking gateway may further include a new device identifier that is allocated by the internet of things server to the internet of things terminal according to a rule of the internet of things server. The interworking gateway records the new device identifier. Subsequently, the internet of things server and the interworking gateway may identify the internet of things terminal using the new device identifier. The interworking gateway may alternatively forward, to the internet of things terminal based on a correspondence between the new device identifier and the address, the messages that are from the internet of things server and that include the new device identifier.

According to a second aspect, this application provides an internet of things apparatus, to implement functions of the interworking gateway in the method in the first aspect. The functions may be implemented by hardware, or may be implemented by executing corresponding software by hardware. The hardware or software includes one or more modules that correspond to the foregoing functions.

According to a third aspect, this application provides an internet of things system, including an internet of things server and an interworking gateway, where the interworking gateway serves as an agent of the internet of things server in a core network, and can perceive a real IP address of an internet of things terminal in an IP subnet in which the core network is located. The interworking gateway replaces the internet of things server to register and authenticate the internet of things terminal, and forwards a message between the internet of things server and the internet of things terminal.

According to a fourth aspect, this application provides a computer readable storage medium, where the computer readable storage medium stores an instruction, and when the instruction runs on a computer, the computer performs the method in the first aspect.

According to a fifth aspect, this application provides a computer program product including an instruction, and when the instruction runs on a computer, the computer performs the method in the first aspect.

DESCRIPTION OF EMBODIMENTS

Figure 1:
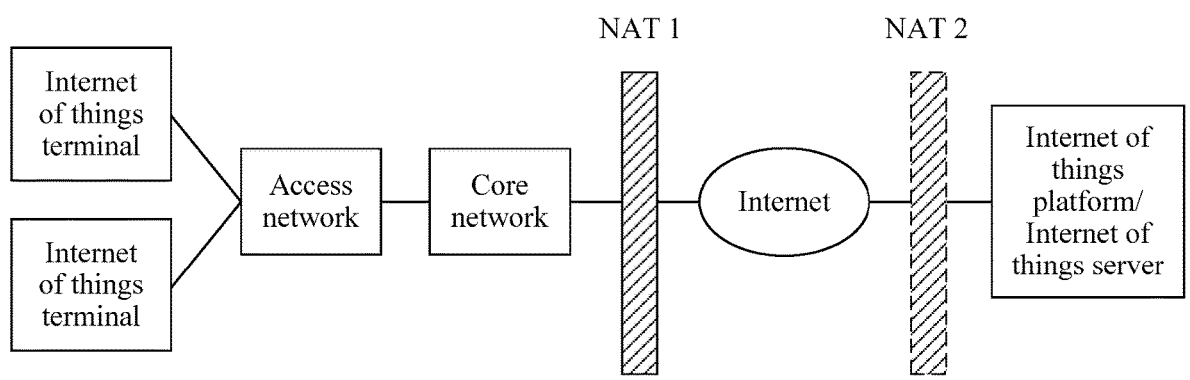
FIG. 1 is a schematic architectural diagram of an internet of things system in other approaches.

FIG. 1 is a typical networking architecture in which an internet of things terminal accesses an internet of things platform or an internet of things server using a telecommunications network. The internet of things platform or the internet of things server performs, for the internet of things terminal, management and operations that are related to a connection, a device, or a service. For ease of description, in this application, the internet of things server is used as an example to describe the technical solutions in the disclosed embodiments, and all the embodiments that are described using the internet of things server as an example are also applicable to the internet of things platform. A core network in FIG. 1 belongs to a telecommunications network provided by a telecommunication operator. The core network may be an evolved packet core network (EPC), a 5G core network, or another type or form of telecommunications network that is defined by the 3rd Generation Partnership Project (3GPP). The internet of things terminal may access the core network using various access technologies or access networks, including an NB-IoT wireless access technology, fourth generation (4G) wireless access, fifth generation (5G) wireless access, Wi-Fi access or wireless network protocol access, wireline access, or the like that is defined by the 3GPP. The core network is connected to the internet of things server using an internet. In consideration of a factor such as security or network planning, a device such as a Network Address Translation (NAT) device or a firewall is usually disposed between the core network and the internet, and between the internet of things server and the internet, to perform network isolation. For example, a NAT device 1 and a NAT device 2 are used in FIG. 1, that is, the internet of things server and the core network are located in different IP subnets or private networks. It should be noted that, if the internet of things server is deployed in a public network, the NAT device 2 may be not used, that is, in FIG. 1, there may be only the NAT device 1 or an address translation device whose function is equivalent to that of the NAT device 1.

It is assumed that the core network and the internet of things server are located in different private networks. The NAT device 1 is located between a private network in which the core network is located and the public network (namely, the internet in FIG. 1), and the NAT device 1 translates between (a private IP address, a private port number) that are of the core network and (a public IP address, a public port number) that are configured on the NAT device 1. The NAT device 2 is located between a private network in which the internet of things server is located and the public network, and the NAT device 2 translates between (a private IP address, a private port number) that are of the internet of things server and (a public IP address, a public port number) that are configured on the NAT device 2. After the internet of things terminal is attached to the core network, a gateway of the core network, for example, a Packet Data Network Gateway (PGW) of an Evolved Packet Core (EPC) network or a user plane (UP) function entity of a 5G core network, allocates a private IP address (private IP-1) of a private network to which the gateway belongs, to the internet of things terminal. The private IP address of the internet of things server is a private IP-2 which is a private IP address of a private network to which the internet of things server belongs; and an external public address of the internet of things server is the public IP address on the NAT device 2, namely, a public IP-A. When the internet of things terminal and the internet of things server exchange messages using the access network, the core network, and the internet, the NAT device performs network address translation between a private address and public IP address for source addresses and destination addresses of the messages. As shown in Table 1, for a message sent by the internet of things terminal to the internet of things server (namely, an uplink message in Table 1), a source address of the uplink message from the internet of things terminal is a private IP-1, and a destination address thereof is a public IP-A. When the uplink message passes the NAT device 1, the NAT device 1 translates the source address of the uplink message to a public IP address on the NAT device 1, namely, a public IP-B. When the uplink message passes the NAT device 2, the NAT device 2 translates the destination address of the uplink message to a private address of the internet of things server, namely, a private IP-2. Correspondingly, for a downlink message sent by the internet of things server to the internet of things terminal, a source address of the message from the internet of things server is a private IP-1, and a destination address thereof is a public IP-B. After being translated by the NAT device 2, the source address of the downlink message is changed to the public IP-B; and after being translated by the NAT device 1, the destination address of the downlink message is translated to the private IP-1. It can be learned that, because the core network and the internet of things server are not in a same IP subnet or private network, the internet of things server cannot learn a private IP address that is allocated by the core network to the internet of things terminal, and an address of the internet of things terminal that is included in an uplink message and that can be perceived by the internet of things server is a public address obtained after NAT translation is performed. After the NAT device allocates the corresponding public address for the address of the internet of things terminal, if the NAT device does not receive a message that is from or sent to the internet of things terminal within a specific period, the NAT device no longer maintains a binding relationship or correspondence between the address of the internet of things terminal and the public address, for example, the NAT device may allocate the public address to another internet of things terminal for use. Such a case in which the NAT device releases the binding relationship or correspondence between the public address allocated to the internet of things terminal and the internet of things terminal is also referred to NAT address aging. When the NAT device subsequently receives a message that is from or sent to the internet of things terminal again, the NAT device allocates a new public address, such as a public IP-C, for the internet of things terminal. To keep the public address that is of the internet of things terminal and that undergoes NAT translation from being aged, generally, the internet of things terminal and the internet of things server send a message such as a heartbeat message, such that the NAT device keeps the binding relationship and correspondence between the public address and the address of the internet of things terminal after NAT translation is performed, and the public address that is perceived by the internet of things server after NAT translation is performed and that is of the internet of things terminal remains unchanged. This method is also referred to as NAT keepalive. It should be noted that an IP address or IP information mentioned in this application may further include information such as a port number, that is, the IP address or the IP information in this application may be an IP address, or may be an IP address and a port number.

TABLE 1

| | Internet of things terminal | | Internet of things server | |
|---|---|---|---|---|
| | Source address | Destination address | Source address | Destination address |
| Uplink message | Private IP-1 | Public IP-A | Public IP-B | Private IP-2 |
| Downlink message | Public IP-B | Private IP-1 | Private IP-1 | Public IP-B |

As described in the background, a complex DTLS authentication scheme is not suitable to authenticate the internet of things terminal, and an authentication scheme based only on a device or a node identifier in an existing physical network protocol is not enough to ensure security. In an IP network, especially in a telecommunications network where a telecommunication operator is credible, a source address of a message is generally difficult to forge. If the internet of things server can authenticate the source address of the uplink message in addition to authenticating the device identifier of the internet of things terminal, security and reliability on authentication of the device can be greatly increased.

However, with a limited battery service life of the internet of things terminal, a limited load capacity of an NB-IoT network, a limited quantity of connections that are newly established in each cell per second, and the like, frequently sending a heartbeat message to keep NAT alive has disadvantages, for example, the battery service life of the internet of things terminal is sharply decreased, and the NB-IoT network load is occupied by a large quantity of low-value heartbeat messages. Therefore, in an actual application, the internet of things terminal generally does not support frequent sending of the heartbeat message, and then the internet of things server perceives that a source address (namely, the public address of the internet of things terminal that is obtained after NAT translation is performed) in an uplink message is not fixed. The internet of things server cannot determine or authenticate an identity of the internet of things terminal using the source address of the uplink message.

Figure 2:
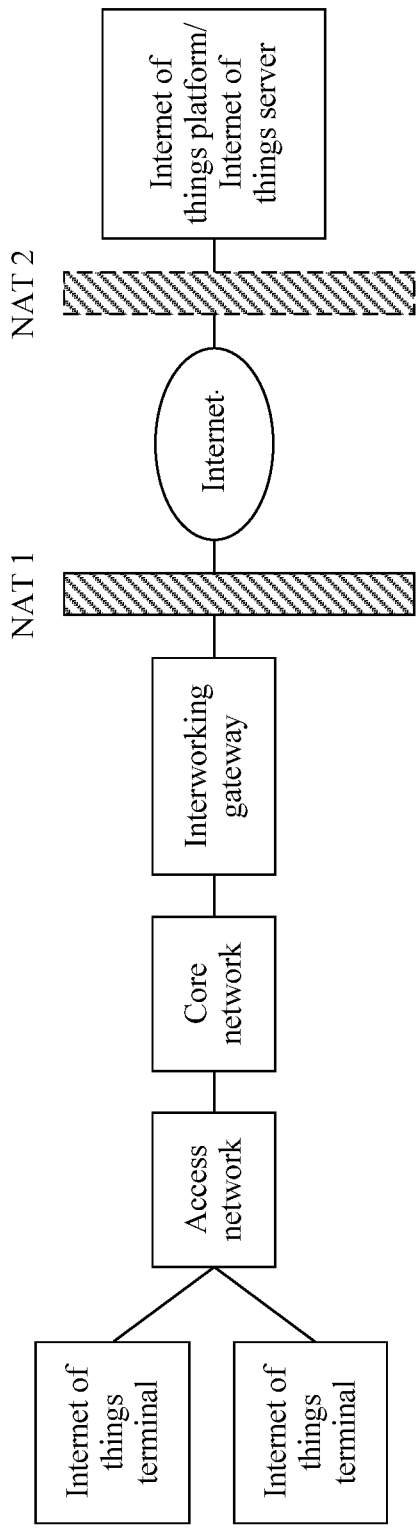
FIG. 2 is a schematic architectural diagram of an internet of things system according to an embodiment of the present disclosure.

As shown in FIG. 2, this application provides a new device, namely, an interworking gateway. The interworking gateway is connected to a core network, for example, the interworking gateway is connected to a PGW or a UP in the core network, and the interworking gateway is located in a same IP subnet or private network as the PGW or UP in the core network. In addition to a short connection that may be used to transmit messages and data, the interworking gateway and an internet of things server may maintain at least one reliable transmission path for communication. The reliable transmission path may be a long connection, such as an encrypted or unencrypted Message Queuing Telemetry Transport (MQTT) long connection, an encrypted or unencrypted CoAP long connection, or an encrypted or unencrypted WebSocket long connection. PGWs or UPs that are in the interworking gateway and a telecommunications network are located in a same IP subnet or private network, and there is no address translation device between the interworking gateway and an internet of things terminal, the interworking gateway may address, in a reliable telecommunications network, the internet of things terminal by directly using a private address of the internet of things terminal. Therefore, no additional heartbeat message needs to be sent between the interworking gateway and the internet of things terminal, thereby reducing power consumption and performance consumption of the internet of things terminal. In addition, when the interworking gateway communicates with the internet of things server using a long-connection transmission path, communication security is ensured and it is not easy to steal and forge transmission information. In this embodiment of this application, a scheme in which the long connection is used between the interworking gateway and the internet of things server is mainly described, and a scheme in which the short connection is used between the interworking gateway and the internet of things server for communication is not described in this application. It should be noted that the interworking gateway may communicate with the internet of things server using both the long connection and the short connection. For example, for an uplink message sent by the interworking gateway to the internet of things server, the short connection is used for communication, and for a downlink message sent by the internet of things server to the interworking gateway, the long connection is used for communication; or for an uplink message sent by the interworking gateway to the internet of things server, the long connection is used for communication, and for a downlink message sent by the internet of things server to the interworking gateway, the short connection is used for communication.

Figure 3:
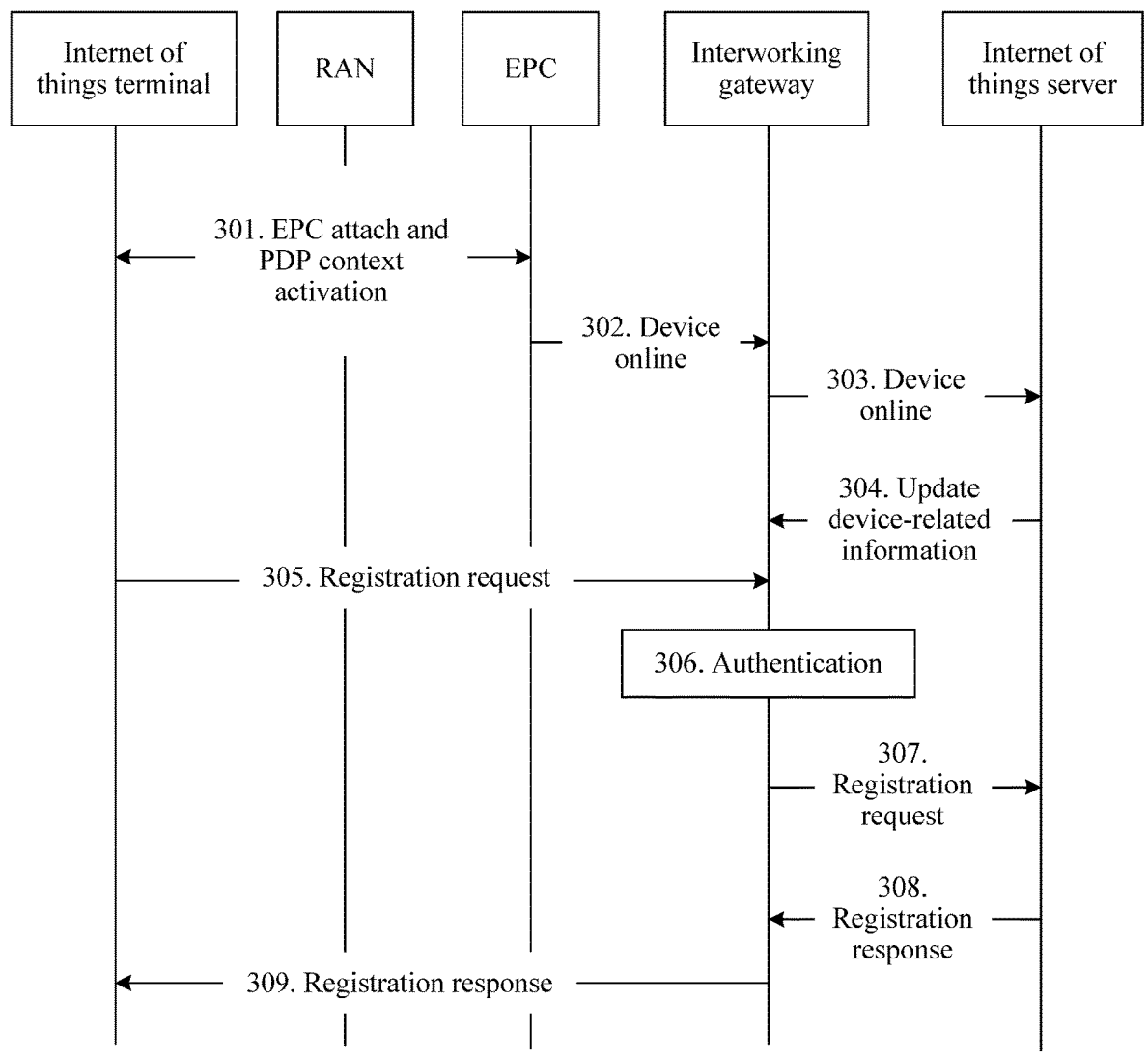
FIG. 3 is a flowchart of an internet of things terminal registration method according to an embodiment of the present disclosure.

FIG. 3 shows a process in which an internet of things terminal is attached to an EPC network using an NB-IoT wireless network and then registered on an internet of things platform in an interworking gateway deployment scenario. The radio access network (RAN) shown in FIG. 3 is an NB-IoT wireless network and is an embodiment of the access network shown in FIG. 1 and FIG. 2. The EPC network is an embodiment of the core network shown in FIG. 1 and FIG. 2. The NAT device and the internet that are shown in FIG. 1 and FIG. 2 still exist in the network of the embodiment shown in FIG. 3. Due to limitation of a message flowchart, neither the NAT device nor the internet is presented in the message flowchart shown in FIG. 3.

301. An internet of things terminal that has registered an account on an internet of things server accesses an NB-IoT wireless network and is attached to an EPC network, and a Packet data protocol (PDP) context is active. For related access and attach procedures and a PDP context activation procedure, refer to related 3GPP standard protocols such as 3GPP TS 23.401 and 3GPP TS 23.060. Details are not described herein. After the internet of things terminal is attached to the EPC network, a PGW in the EPC network allocates an IP address to the internet of things terminal. It is assumed that the allocated IP address is a private IP-1. It should be noted that account registration indicates that the internet of things server has recorded device-related information of the internet of things terminal, including information such as a device identifier and an International Mobile Subscriber Identification Number (IMSI), where the device identifier may be a node identifier (NodeID), an International Mobile Equipment Identity (IMEI), a media access control (MAC) address, a serial number (SN), or the like.

302. The EPC network notifies an interworking gateway that the internet of things terminal has been attached to the EPC network. In FIG. 3, "device online" means that the internet of things terminal is attached to the EPC network. A message in step 302 includes at least the IP address that is allocated by the PGW in the EPC network to the internet of things terminal, and the IMSI of the internet of things terminal. This embodiment imposes no limitation on a specific network element that notifies the interworking gateway and that is in the EPC network. In some implementations, the network element that notifies the interworking gateway may be a Mobility Management Entity (MME), a PGW, a Home Subscriber Server (HSS), a Policy and Charging Rules Function (PCRF) unit, or the like. When the PGW in the EPC network is connected to the interworking gateway and the PGW sends the message in step 302 to the interworking gateway, in a possible implementation, the PGW may communicate with the interworking gateway using a Diameter protocol or a RADIUS protocol. For example, an Accounting Request (ACR) message is used to notify the interworking gateway that the device gets online, and the ACR message carries the IP address and the IMSI that are of the internet of things terminal.

303. The interworking gateway notifies the internet of things server that the internet of things terminal gets online, where a notification message includes at least the IP address and the IMSI that are of the internet of things terminal. It should be noted that, in an embodiment of this application, the interworking gateway may send the message to the internet of things server using a long connection that has been established to the internet of things server, or in another manner. The internet of things server receives the message in step 303, queries the device information of the internet of things terminal that has registered the account, determines the device identifier of the internet of things terminal corresponding to the IMSI, and records the IP address and the IMSI that are of the internet of things terminal. It is assumed that the interworking gateway sends the message in step 303 using an MQTT long connection between the interworking gateway and the internet of things server, and a possible message format of the message in step 303 is as follows:

```
Topic:.IGs.{IGId}.event.radiusEvent
Payload:
{
    "header": {
        "from": "***",
        "to": "***",
        "requestId": "{requestId}",
        "timestamp": "{timestamp}",
    },
    "body": {
        RadiusMessageType": "{Start}",
        "UE_IP": "{UE_IP}",
        "IMSI": "{IMSI}",
    }
}
```

"IG" represents the interworking gateway interworking gateway, and "radius" represents the RADIUS protocol.

304. The internet of things server sends a message to the interworking gateway, to update information that is related to the internet of things terminal and that is recorded by the interworking gateway. The message in step 304 includes at least the IP address, the IMSI, and the device identifier that are of the internet of things terminal. It should be noted that, in an embodiment of this application, the internet of things server may send the message to the interworking gateway using a long connection between the internet of things server and the interworking gateway, or in another manner. The interworking gateway receives the message in step 304, and records the IP address, the IMSI, and the device identifier that are of the internet of things terminal. It should be noted that, after receiving the message in step 302, the interworking gateway may directly record the IP address of the internet of things terminal; and the interworking gateway may not send, to the internet of things server, the IP address of the internet of things terminal, that is, the message in step 303 does not include the IP address of the internet of things terminal. In this case, the internet of things server adds the IMSI and the device identifier that are of the internet of things terminal to the message in step 304. It is assumed that the internet of things server sends the message in step 304 using an MQTT long connection between the internet of things server and the interworking gateway, and a possible message format of the message in step 304 is as follows:

---

Topic:.IGs.{IGId}.event.radiusEvent
Payload:
{
    "header": {
        "from": "***",
        "to": "***",
        "requestId": "{requestId}",
        "timestamp": "{timestamp}",
    },
    "body": {
        "RadiusMessageType": "{Start}",
        "UE_IP": "{UE_IP}",
        "IMSI": "{IMSI}",
        "deviceNodeID": "{NodeID}",
    }
}

---

After the interworking gateway saves a correspondence between the device identifier and the address that are of the internet of things terminal, for a subsequently received message that is from the internet of things server and that needs to be forwarded to the internet of things terminal, provided that the message from the internet of things server includes the device identifier of the internet of things terminal, the interworking gateway may query, based on the device identifier, the corresponding address of the internet of things terminal, and then forward the message from the internet of things server to the internet of things terminal.

305. The internet of things terminal sends, using an access network and a core network, a registration request to the interworking gateway, where a destination address of the registration request is an IP address of the interworking gateway, a source address thereof is the IP address of the internet of things terminal, and the IP address of the interworking gateway and the IP address of the internet of things terminal belong to a same IP subnet or a private network. The registration request includes the device identifier of the internet of things terminal. An address of the interworking gateway may be preset on the internet of things terminal, or may be delivered using a bootstrap procedure to the internet of things terminal before the internet of things terminal is registered. A transmission path of the registration request may be that the registration request is sent to the interworking gateway using a PGW through an NB-IoT wireless network, or may be that the registration request is sent to the interworking gateway using another path. This embodiment imposes no limitation on message routing and forwarding in the EPC network.

306. The interworking gateway receives the registration request from the internet of things terminal, and parses the request to obtain the source address (namely, the IP address of the internet of things terminal) and the device identifier. The interworking gateway determines whether the IP address and the device identifier that are included in the registration request are recorded in the interworking gateway, and whether a correspondence between the IP address and the device identifier that are included in the registration request is the same as the correspondence between the IP address and the device identifier that are recorded in the interworking gateway. If the IP address and the corresponding device identifier that are recorded in the interworking gateway are the same as the IP address and the device identifier that are included in the registration request, the interworking gateway successfully authenticates the internet of things terminal. If the IP address and the device identifier that are included in the registration request have no corresponding record in the interworking gateway, or the IP address and the device identifier that are included in the registration request are different from the IP address and the device identifier that are recorded in the interworking gateway, or the correspondence between the IP address and the device identifier that are included in the registration request is different from the correspondence between the IP address and the device identifier that are recorded in the interworking gateway, the internet of things terminal fails to be authenticated, and the interworking gateway considers that the internet of things terminal is an invalid terminal, and therefore rejects the registration request.

307. After successfully authenticating the internet of things terminal, the interworking gateway sends the registration request to the internet of things server. The internet of things server creates a registration record for the internet of things terminal. Optionally, the internet of things server may further allocate a new device identifier to the internet of things terminal.

308. The internet of things server returns a registration response to the interworking gateway, where the registration response includes the device identifier of the internet of things terminal. If the internet of things server allocates a new device identifier to the internet of things terminal, the internet of things server may further add, to the registration response in step 308, the new device identifier that is allocated by the internet of things server to the internet of things terminal, and the interworking gateway records the new device identifier that is allocated by the internet of things server to the internet of things terminal. Subsequently, the internet of things server and the interworking gateway may identify the internet of things device using the new device identifier. The interworking gateway may obtain, through query based on a new device identifier that is of an internet of things terminal and that is included in a message from the internet of things server, a corresponding address of the internet of things terminal, and then forward the message from the internet of things server to the internet of things terminal using the core network.

309. The interworking gateway determines a corresponding address of the internet of things terminal based on the device identifier that is of the internet of things terminal and that is included in the registration response, and sends the registration response to the internet of things terminal using the core network, where the source address of the registration response is the IP address of the interworking gateway, and the destination address of the registration response is the IP address of the internet of things terminal. Optionally, the registration response may include the new device identifier that is allocated by the internet of things server to the internet of things terminal.

So far, the internet of things terminal completes a registration procedure on the internet of things server. It can be learned from the technical solution shown in FIG. 3 that, from a perspective of the internet of things terminal, the internet of things terminal registers with a destination address of the interworking gateway. However, actually, the interworking gateway serves as an agent of the internet of things server in an operator network (an EPC network); and because the interworking gateway can perceive a real IP address of the internet of things terminal and obtain the device identifier of the internet of things terminal from the internet of things server, the interworking gateway may replace the internet of things server to authenticate the internet of things terminal. Therefore, actually, the internet of things terminal finally registers with a destination address of the internet of things server. Because the interworking gateway is deployed on a communication path between the internet of things terminal and the internet of things server, the interworking gateway may further record or process service data of the internet of things terminal based on a service requirement, such as local data processing, data cleansing, and data caching. In addition, deployment of the interworking gateway further shields a difference among a huge quantity of the internet of things terminals, thereby simplifying processing of the internet of things server. Different internet of things terminals may support different communication protocols. However, because of translation and forwarding performed by the interworking gateway, the internet of things server may communicate, using the interworking gateway, with different internet of things terminals based on a same connection manner, message format, or cell type. For example, device identifiers that are supported by the internet of things terminals may vary greatly in type and encoding format. However, the internet of things server allocates a new device identifier to the internet of things terminal, and notifies the interworking gateway of the new device identifier by adding the new device identifier to the message in step 308, and therefore, the internet of things server and the interworking gateway may identify different internet of things terminals using the device identifiers of a same type and a same format. The interworking gateway is responsible for translation between information such as the device identifier allocated by the internet of things server, the device identifier supported by the internet of things terminal, and the IP address of the internet of things terminal.

Figure 4:
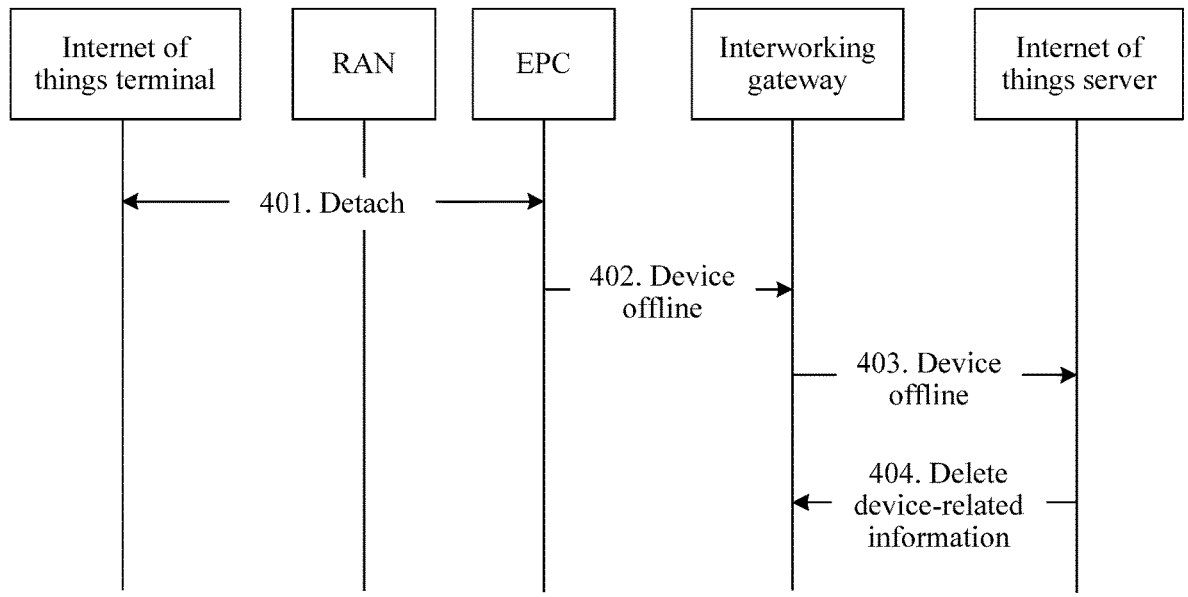
FIG. 4 is a flowchart of an internet of things terminal detach method according to an embodiment of the present disclosure.

Actually, a message or data that is sent by the internet of things server to the internet of things terminal is first sent to the interworking gateway, and then forwarded by the interworking gateway to the internet of things terminal, and therefore, the internet of things server further needs to record and update in real time the interworking gateway that is connected to the internet of things terminal using the access network and the core network. For example, in the procedure shown in FIG. 3, after the internet of things server receives the message in step 303 that is sent by the interworking gateway, the internet of things server needs to record an identifier of the interworking gateway, and the internet of things server can subsequently communicate with the internet of things terminal using the interworking gateway. It should be noted that the internet of things terminal may communicate with the internet of things server using different interworking gateways. For example, in a scenario in which the internet of things terminal roams, the internet of things terminal may be connected to different interworking gateways in different regions. For another example, in a disaster recovery and backup scenario, the core network may connect the internet of things terminal to different interworking gateways. Therefore, after receiving the message in step 303, the internet of things server further needs to determine whether an interworking gateway (namely, an interworking gateway previously connected to the internet of things terminal) that is locally recorded and that is connected to the internet of things terminal is the same as the interworking gateway (namely, an interworking gateway currently connected to the internet of things terminal) that sends the message in step 303. If the interworking gateway that is locally recorded and that is connected to the internet of things terminal is different from the interworking gateway that sends the message in step 303, the internet of things terminal further needs to send a message to the interworking gateway previously connected to the internet of things terminal, to notify the interworking gateway previously connected to the internet of things terminal of clearing related records and information of the internet of things terminal, for example, the device identifier, the IP address, the IMSI, and like information that are of the internet of things terminal. In addition, after the internet of things terminal is disconnected from the core network, for example, in a scenario in which the internet of things terminal is powered off, the core network sends a message to the interworking gateway to update a status of the internet of things terminal; and then the interworking gateway notifies the internet of things server of updating the status of the internet of things terminal. In this case, the internet of things server also notifies the interworking gateway of clearing related information of the internet of things terminal, as shown in FIG. 4.

401. An internet of things terminal is disconnected from a core network. For a detailed procedure, refer to a detach procedure defined in a 3GPP standard. Details are not described herein.

402. An EPC network notifies an interworking gateway that the internet of things terminal has been disconnected from the EPC network. In FIG. 3, "device offline" means that the internet of things terminal is detached. A message in step 402 includes at least an IMSI of the internet of things terminal. This embodiment imposes no limitation on a specific network element that notifies the interworking gateway and that is in the EPC network. In some implementations, the network element that notifies the interworking gateway may be a mobility management entity (MME), a PGW, a home subscriber server (HSS), a policy and charging rules function (PCRF) unit, or the like. When the PGW in the EPC network is connected to the interworking gateway, and the PGW sends the message in step 402 to the interworking gateway, in a possible implementation, the PGW may communicate with the interworking gateway using a Diameter protocol or a RADIUS protocol. For example, an ACR message is used to notify the interworking gateway that the device gets offline, and the ACR message carries the IMSI of the internet of things terminal.

403. The interworking gateway receives a device offline notification, and forwards the device offline notification to an internet of things server.

404. The internet of things server receives the message in step 403 and updates a locally recorded status of the internet of things terminal, for example, the recorded status of the internet of things terminal is "unreachable". In addition, the internet of things server sends a message in step 404 to the interworking gateway to notify the interworking gateway of clearing related records and information of the internet of things terminal, for example, a device identifier, an IP address, and the IMSI, and like information that are of the internet of things terminal. The message in step 404 includes at least the device identifier or the IMSI of the internet of things terminal, where the device identifier may be a device identifier that is allocated by the internet of things server to the internet of things terminal in a registration procedure of the internet of things terminal.

The internet of things server notifies, in a timely manner, the interworking gateway of updating or deleting information and records that are recorded by the interworking gateway and that are of the internet of things terminal, to avoid recording invalid or expired information of the internet of things terminal on the interworking gateway, reduce a volume of data that needs to be maintained by the interworking gateway, and improve performance of the interworking gateway.

Figure 5:
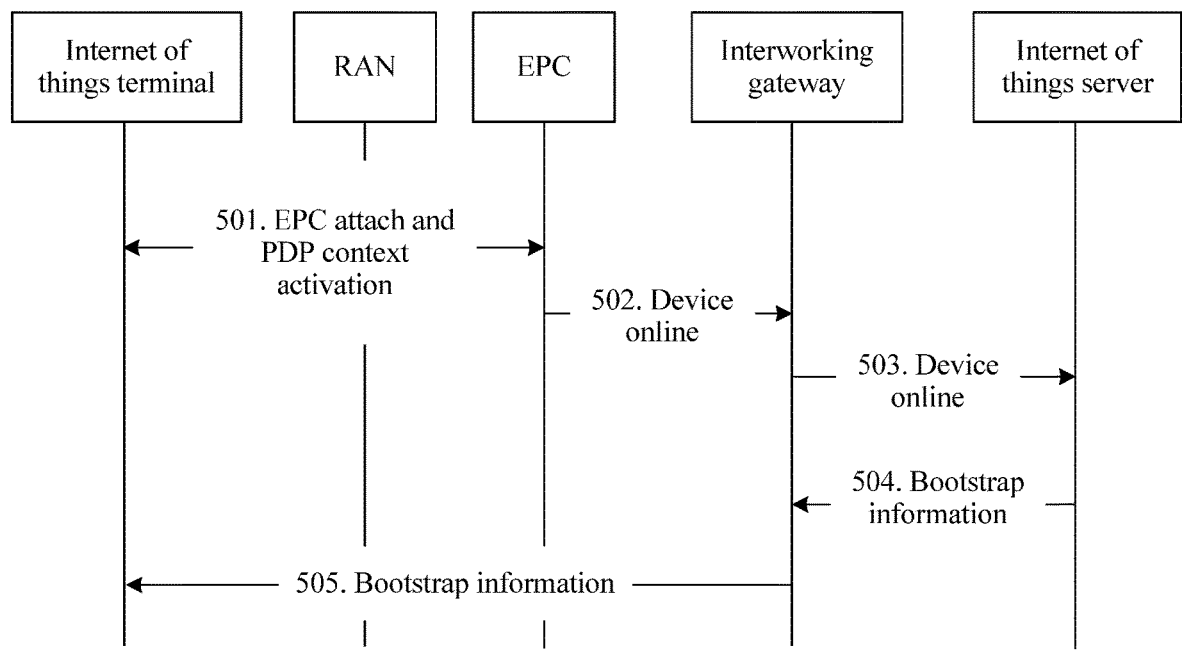
FIG. 5 is a flowchart of a bootstrap method according to an embodiment of the present disclosure.

In the procedure shown in FIG. 3, the internet of things terminal sends the registration request to the interworking gateway using the message in step 305. The address of the interworking gateway may be pre-configured in the internet of things terminal, or may be sent by a bootstrap server to the internet of things terminal by following a procedure shown in FIG. 5 before the message in step 305 is sent. The bootstrap server is configured to send, to the internet of things terminal, initialization information required for device running, such as an address of a registration server, and software and hardware version information. It should be noted that, internet of things servers may be functionally classified into a plurality of types, such as a device management server, a service server, and a bootstrap server. Each of these functions may be separately deployed as one internet of things server, or all of these functions may be performed by one internet of things server. A bootstrap function that is performed by the internet of things server in FIG. 5 may be performed by an independently disposed bootstrap server, or may be performed by the internet of things server in FIG. 3. It should be further noted that the internet of things server that is shown in FIG. 5 and that performs the bootstrap function records whether the terminal performs a bootstrap procedure.

Messages in steps 501 to 503 are the same as the messages in steps 301 to 303. Details are not described herein again.

504. An internet of things server receives the message in step 503, determines, based on an IMSI included in the message in step 503, that an internet of things terminal has not completed a bootstrap procedure, and therefore, sends bootstrap information to an interworking gateway, where the bootstrap information includes at least a device identifier of the internet of things terminal and an address or identifier of the interworking gateway. The identifier may be a Uniform Resource Identifier (URI); and a specific format of the URI is not limited, and may be a Fully Qualified Domain Name (FQDN) format or any other format. It should be noted that, in this embodiment, before sending the message in step 504 to the interworking gateway, the internet of things server has sent the device identifier and an address that are of the internet of things terminal to the interworking gateway using the message in step 304.

505. The interworking gateway receives the message in step 504, determines, based on the device identifier of the internet of things terminal, an address of the internet of things terminal, and sends, to the internet of things terminal, the bootstrap information that includes the address or identifier of the interworking gateway. The internet of things terminal receives the message, and the address of the interworking gateway is used as a destination address for subsequent registration.

Based on the procedure shown in FIG. 5, a manufacturer of the internet of things terminal may not pre-configure the bootstrap information in a production phase. This not only reduces production costs, but also reduces a requirement for a supply chain. For example, during product delivery and exchange, it is not required to match bootstrap information pre-configured in an internet of things terminal and an order.

The foregoing mainly describes the solutions provided in this application from a perspective of a method procedure. It can be understood that, to implement the foregoing functions, all devices or network elements, for example, the interworking gateway and the internet of things server, include corresponding hardware structures and/or software modules for performing the functions. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 6:
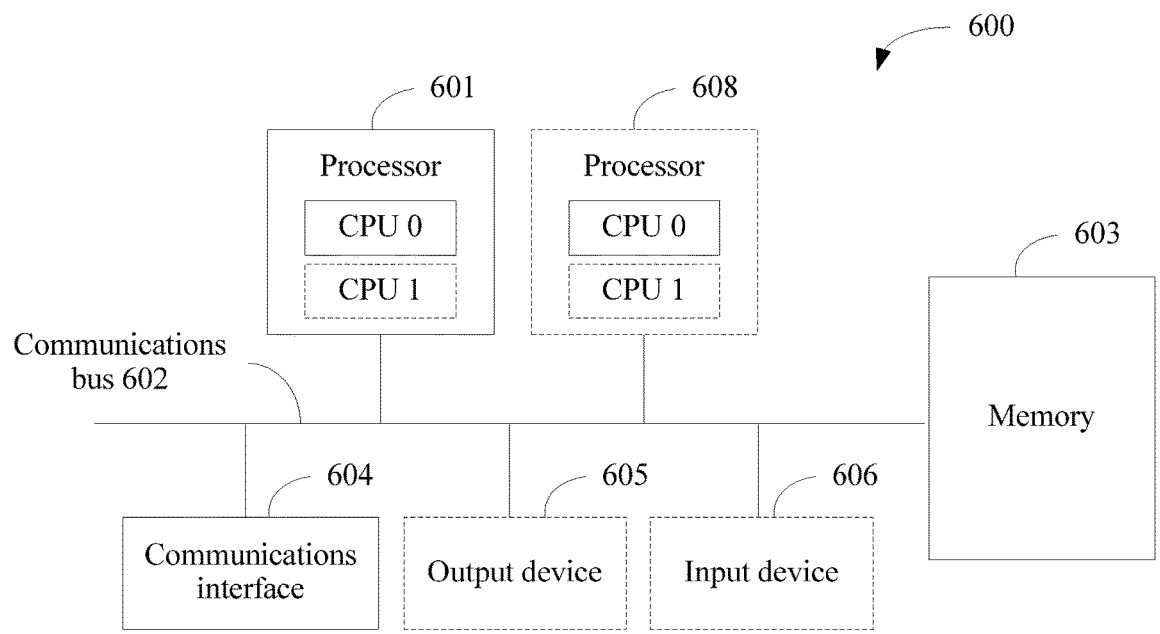
FIG. 6 is a schematic diagram of a computer device according to an embodiment of the present disclosure.

The interworking gateway provided in this application may be implemented by a computer device (or a system) in FIG. 6.

FIG. 6 is a schematic diagram of a computer device according to this application. The computer device 600 includes at least one processor 601, a communications bus 602, a memory 603, and at least one communications interface 604.

The processor 601 may be a general-purpose central processing unit (CPU), a microprocessor, an application-specific integrated circuit (ASIC), or one or more integrated circuits (ICs) configured to control program execution of the solutions in this application.

The communications bus 602 may include a path for transmitting information between the foregoing components.

The communications interface 604 can be any apparatus such as a transceiver, and is configured to communicate with another device or a communications network, such as the Ethernet, a radio access network (RAN), or a wireless local area network (WLAN).

The memory 603 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc (CD) read-only memory (CD-ROM) or another compact disc storage, an optical disc storage (including a compact disc, a laser disc, an optical disc, a digital versatile disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently and is connected to the processor using the bus. Alternatively, the memory may be integrated with the processor.

The memory 603 is configured to store application program code for executing the solutions in this application, and the processor 601 controls the execution. The processor 601 is configured to execute the application program code stored in the memory 603, to implement a function of an interworking gateway in the present patent method.

In an embodiment, the processor 601 may include one or more CPUs, for example, a CPU 0 and a CPU 1 in FIG. 6.

In an embodiment, the computer device 600 may include a plurality of processors, for example, a processor 601 and a processor 608 in FIG. 6. Each of the processors may be a single-core (or single-CPU) processor, or may be a multi-core (or multi-CPU) processor. The processor herein may be one or more devices, circuits, and/or processing cores used to process data (for example, a computer program instruction).

In an embodiment, the computer device 600 may further include an output device 605 and an input device 606. The output device 605 communicates with the processor 601, and may display information in a plurality of manners. For example, the output device 605 may be a liquid crystal display (LCD), a light emitting diode (LED) display device, a cathode-ray tube (CRT) display device, or a projector. The input device 606 communicates with the processor 601, and may receive an input of a user in a plurality of manners. For example, the input device 606 may be a mouse, a keyboard, a touchscreen device, or a sensing device.

The computer device 600 may be a general-purpose computer device or a dedicated computer device. In an implementation, the computer device 600 may be a desktop computer, a portable computer, a dedicated server, a communications device, an embedded device, or a device having a structure similar to that in FIG. 6. A type of the computer device 600 is not limited in this application.

In this application, the interworking gateway may be further divided into functional modules. For example, each functional module may be obtained through division based on a corresponding function, or two or more functions may be integrated into one module. The integrated module may be implemented in a form of hardware, or may be implemented in a form of a software function module. It should be noted that the module division in the embodiments of the present disclosure is an example, and is only logical function division. There may be other division manners in actual implementation.

Figure 7:
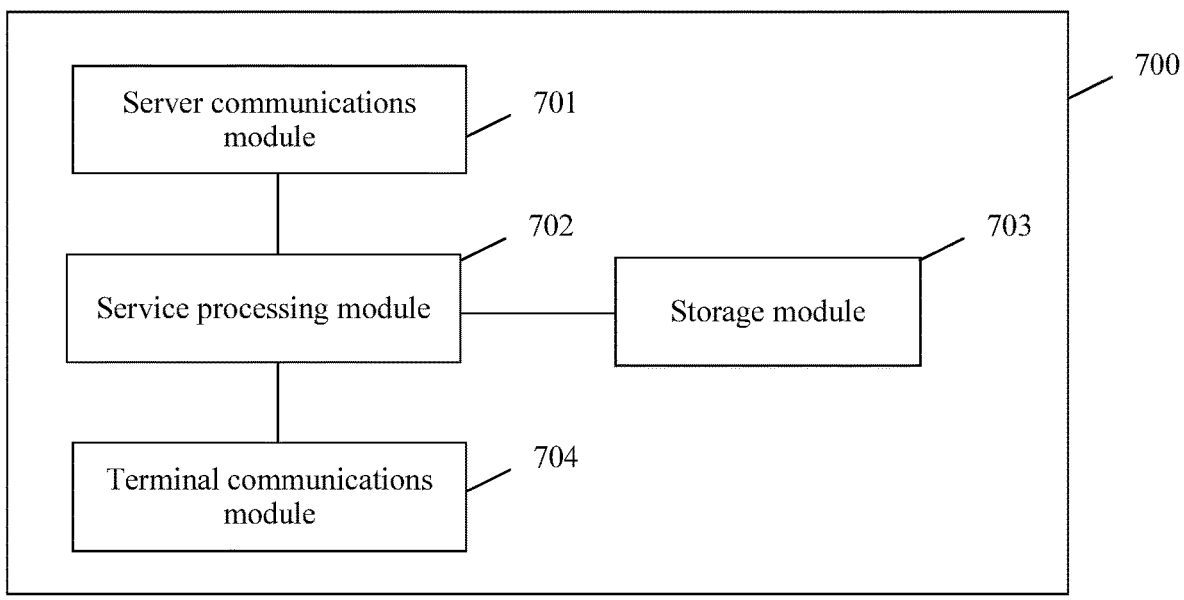
FIG. 7 is a schematic diagram of an interworking gateway function module according to an embodiment of the present disclosure.

For example, FIG. 7 is a schematic structural diagram of an apparatus, and the apparatus implements functions of the interworking gateway in the foregoing embodiments. A function of a functional module in the apparatus 700 may be implemented by a chip. This is not specifically limited in this embodiment of this application.

As shown in FIG. 7, the apparatus 700 includes a server communications module 701, a service processing module 702, a storage module 703, and a terminal communications module 704.

The server communications module 701 is configured to communicate with an internet of things server. For example, the server communications module 701 creates and maintains a long connection between an interworking gateway and the internet of things server, to communicate with the internet of things server using the long connection or another connection mode.

The service processing module 702 is configured to: process a message that is received by the server communications module 701 from the internet of things server; send, to an internet of things terminal using the terminal communications module 704, a message that needs to be forwarded to the internet of things terminal; process a message that is received by the terminal communications module 704 from the internet of things terminal; and send, to an internet of things server using the server communications module 701, a message that needs to be forwarded to the internet of things server. The storage module 703 stores information (for example, a device identifier that is allocated by the internet of things server to the internet of things terminal, and a device identifier, an IP address, and an IMSI that are of the internet of things terminal) that needs to be stored or recorded in a message or service processing procedure of the service processing module 702. When translating or forwarding a message between the internet of things server and the internet of things terminal, the service processing module 702 further needs to obtain necessary information from the storage module 703. For example, when the service processing module 702 processes the message that is received by the server communications module 701 from the internet of things server, and it is determined that the message needs to be forwarded to the internet of things terminal, the service processing module 702 obtains, from the storage module 703 based on the device identifier (which may be the device identifier that is allocated by the internet of things server to the internet of things terminal) that is carried in the message from the internet of things server and that is of the internet of things terminal, the IP address that corresponds to the device identifier of the internet of things terminal; and sends the message from the internet of things server to the internet of things terminal using the terminal communications module 704. Service processing supported by the service processing module 702 includes message parsing, message format translation, message forwarding, processing of information or data in a message, storage of the information or data in the message, and the like.

The storage module 703 interacts with the service processing module 702, and is responsible for storing and reading data or information.

The terminal communications module 704 receives the message from the internet of things terminal using a core network and an access network, or sends a message to the internet of things terminal using a core network and an access network.

The functional module may be implemented in a form of hardware, or may be implemented in a form of a software function module. In a simple embodiment, a person skilled in the art may figure out that the apparatus 700 may use a form shown in FIG. 6. For example, the service processing module 702 in FIG. 7 may be implemented by the processor 601 in FIG. 6, and the storage module in FIG. 7 may be implemented by the memory 603 in FIG. 6. This is not limited in this embodiment of the present disclosure. Optionally, when the apparatus 700 shown in FIG. 7 is a chip, functions/implementation processes of the server communications module 701 and the terminal communications module 704 may alternatively be implemented by a pin or a circuit. Optionally, the storage module 703 may be a storage unit in the chip, for example, a register or a cache. Alternatively, the storage module 703 may be a storage unit located outside the chip.

All or some of the foregoing embodiments may be implemented by software, hardware, firmware, or any combination thereof. When the embodiments are implemented by software, the embodiments may be implemented fully or partially in a form of a computer program product. The computer program product includes one or more computer instructions. When the computer program instructions are loaded and executed on a computer, the procedures or the functions according to the embodiments of the present disclosure are fully or partially generated. The computer may be a general-purpose computer, a dedicated computer, a computer network, or another programmable apparatus.

The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

In the foregoing implementations, the objectives, technical solutions, and benefits of the present disclosure are further described in detail. A person skilled in the art should understand that the foregoing descriptions are merely example implementations of the present disclosure, but are not intended to limit the protection scope of the present disclosure. Any modification, equivalent replacement, improvement, or the like made based on the technical solutions in the present disclosure shall fall within the protection scope of the present disclosure. In the claims, "comprising" does not exclude another component or another step, and "a" or "one" does not exclude a case of a plurality of A single processor or another unit may implement several functions enumerated in the claims. Some measures are recorded in dependent claims that are different from each other, but this does not mean that these measures cannot be combined to produce a better effect.

What is claimed is:

1. An Internet of Things (IoT) system comprising:
    a memory;
    a processor;
    an IoT server configured to:
        record account registration information of an IoT terminal, wherein the account registration information comprises an International Mobile Subscriber Identity (IMSI) and a first device identifier of the IoT terminal, and wherein the first device identifier is a node identifier (NodeID) that is based on reporting in a registration process, an International Mobile Equipment Identity (IMEI), or a Medium Access Control (MAC) address;
        process a registration request of the IoT terminal, wherein the registration request comprises a source address and a second device identifier of the IoT terminal; and
        allocate a new device identifier and an address to the IoT terminal in response to the registration request; and
    an interworking gateway configured to:
        receive the registration request from the IoT terminal;
        receive, from a telecommunications network, a first message comprising the address and the IMSI, wherein the first message indicates that the IoT terminal has established a connection to the telecommunications network;
        authenticate the IoT terminal when the address is the same as the source address and when the first device identifier is the same as the second device identifier;
        send the registration request to the IoT server when successfully authenticating the IoT terminal;
        receive the new device identifier; and
        record the new device identifier.

2. The IoT system of claim 1, wherein the interworking gateway is further configured to:
    send, to the IoT server, a second message comprising the IMSI, wherein the second message indicates that the IoT terminal has established the connection; and
    receive the first device identifier from the IoT server, and wherein the IoT server is further configured to:
    receive the second message from the interworking gateway; and
    send the first device identifier to the interworking gateway.

3. The IoT system of claim 1, wherein the first message is an accounting request message.

4. The IoT system of claim 1, wherein the IoT server is further configured to send, to the interworking gateway, a bootstrap message comprising a third device identifier of the IoT server, wherein the bootstrap message indicates that the IoT terminal initiates registration to the interworking gateway, and wherein the interworking gateway is further configured to:
    receive the bootstrap message from the IoT server;
    determine, based on the first device identifier, the address;
    set a destination address of the bootstrap message to the address; and
    send the bootstrap message to the IoT terminal.

5. The IoT system of claim 1, wherein the IoT server is further configured to send a registration response to the interworking gateway after processing the registration request, wherein the registration response comprises the first device identifier, and wherein the interworking gateway is further configured to:
    receive the registration response;
    determine, based on the first device identifier, the address;
    set a first destination address of the registration response to the address; and
    send the registration response to the IoT terminal.

6. The IoT system of claim 5, wherein the registration response further comprises the new device identifier, and wherein the interworking gateway is further configured to further receive the new device identifier in the registration response.

7. The IoT system of claim 5, wherein the IoT server is further configured to send a third message to the interworking gateway after the interworking gateway sends the registration response to the IoT terminal, wherein the third message comprises the first device identifier or an identifier allocated by the IoT server to the IoT terminal, and wherein the interworking gateway is further configured to:
    receive the third message;
    determine, based on the first device identifier or the identifier, the address;
    set a second destination address of the third message to the address; and
    send the third message to the IoT terminal.

8. The IoT system of claim 1, wherein the interworking gateway is located in a same Internet Protocol (IP) subnet or private network as a packet data network gateway or a user plane device in a core network.

9. The IoT system of claim 8, wherein the interworking gateway is further configured to directly interwork with the packet data network gateway or the user plane device without IP address translation.

10. The IoT system of claim 1, wherein the interworking gateway is further configured to:
    record a correspondence between the address and the first device identifier; and further authenticate the IoT terminal based on the correspondence.

11. The IoT system of claim 1, wherein the first device identifier is not an Internet Protocol (IP) address.

12. The IoT system of claim 1, wherein the processor is configured to implement at least one of the IoT server, the interworking gateway, or the IoT terminal.

13. The IoT system of claim 1, wherein the memory is configured to implement at least one of the IoT server, the interworking gateway, or the IoT terminal.

14. A method comprising:
receiving a registration request of an Internet of Things (IoT) terminal, wherein the registration request comprises a source address and a second device identifier of the IoT terminal;
receiving, from a telecommunications network, a first message comprising an address and an International Mobile Subscriber Identity (IMSI) of the IoT terminal, wherein the first message indicates that the IoT terminal has established a connection to the telecommunications network;
authenticating, by an interworking gateway, the IoT terminal when an address that is allocated by a telecommunications network to the IoT terminal is the same as the source address and when a first device identifier that is recorded in an IoT server and that is of the IoT terminal is the same as the second device identifier, wherein the first device identifier is a node identifier (NodeID) that is based on reporting in a registration process, an International Mobile Equipment Identity (IMEI), or a Medium Access Control (MAC) address;
sending the registration request to the IoT server when successfully authenticating the IoT terminal;
receiving a registration response from the IoT server and in response to the registration request, wherein the registration response comprises a new device identifier that is of the IoT terminal and that is based on the registration request; and
recording the new device identifier.

15. The method of claim 14, wherein after receiving the first message, the method further comprises:
sending, to the IoT server, a second message comprising the IMSI and indicating that the IoT terminal has established the connection; and
receiving, from the IoT server, the first device identifier.

16. The method of claim 14, wherein the first message is an accounting request message.

17. The method of claim 14, further comprising:
receiving the first device identifier;
receiving, from the IoT server, a bootstrap message comprising both a third device identifier of the IoT server and either a third address or an identifier of the interworking gateway, wherein the bootstrap message indicates that the IoT terminal initiates registration to the interworking gateway;
determining, based on the third device identifier, the address;
setting a destination address of the bootstrap message to the address; and
sending the bootstrap message to the IoT terminal.

18. The method of claim 14, wherein after sending the registration request, the method further comprises:
determining, based on the new device identifier, the address;
setting a first destination address of the registration response to the address; and
sending the registration response to the IoT terminal.

19. The method of claim 18, wherein after sending the registration request, the method further comprises:
receiving, from the IoT server, a third message comprising the first device identifier or the new device identifier;
determining, based on the first device identifier or the new device identifier, the address;
setting a second destination address of the third message to the address; and
sending the third message to the internet of things terminal.

20. The method of claim 14, further comprising:
recording a correspondence between the address and the first device identifier; and
further authenticating the IoT terminal based on the correspondence.

21. The method of claim 14, wherein the first device identifier is not an Internet Protocol (IP) address.

22. An apparatus comprising:
a server communications module implemented by a circuit
a terminal communications module implemented by the circuit and configured to:
receive a registration request of an Internet of Things (IoT) terminal, wherein the registration request comprises a source address and a second device identifier of the IoT terminal; and
receive, from a telecommunications network, a first message comprising an address and an International Mobile Subscriber Identity (IMSI) of the IoT terminal, wherein the first message indicates that the IoT terminal has established a connection to the telecommunications network;
a storage module implemented by a memory and configured to store related information of the IoT terminal, wherein the related information comprises the address and a first device identifier of the IoT terminal, wherein the address is allocated by the telecommunications network, wherein the first device identifier is a node identifier (NodeID) that is based on reporting in a registration process, an International Mobile Equipment Identity (IMEI) or a Medium Access Control (MAC) address, and wherein the first device identifier is in an IoT server; and
a service processing module implemented by a processor and configured to:
parse the registration request;
authenticate the IoT terminal when the address is the same as the source address and when the first device identifier is the same as the second device identifier;
send the registration request to the IoT server and using the server communications module when successfully authenticating the IoT terminal;
receive a registration response from the IoT server and in response to the registration request, wherein the registration response comprises a new device identifier that is of the IoT terminal and that is based on the registration request; and
record the new device identifier.

23. The apparatus of claim 22, wherein before receiving the registration request, the terminal communications module is further configured to receive, from the telecommunications network, a first message comprising the address and an International Mobile Subscriber Identity (IMSI) that are of the IoT terminal, wherein the first message indicates that the IoT terminal has established a connection to the telecommunications network, wherein the service processing module is further configured to:
- parse the first message;
- record the address in the storage module; and
- construct a second message to be sent to the IoT server,
- wherein the second message comprises the IMSI,
- wherein the second message indicates that the IoT terminal has established the connection,
- wherein the server communications module is further configured to:
  - send the second message to the IoT server; and
  - receive the first device identifier from the IoT server, and
- wherein the service processing module is further configured to record, in the storage module, the first device identifier.

24. The apparatus of claim 22, wherein the service processing module is further configured to:
- record a correspondence between the address and the first device identifier; and
- further authenticate the IoT terminal based on the correspondence.

\* \* \* \* \*

UNITED STATES PATENT AND TRADEMARK OFFICE
CERTIFICATE OF CORRECTION

| | | |
|---|---|---|
| PATENT NO. | : 11,729,615 B2 | Page 1 of 1 |
| APPLICATION NO. | : 16/600914 | |
| DATED | : August 15, 2023 | |
| INVENTOR(S) | : Kai Zhou | |

It is certified that error appears in the above-identified patent and that said Letters Patent is hereby corrected as shown below:

In the Claims

Claim 22, Column 20, Line 21 & 22: "by a circuit" should read "by a circuit;"

Signed and Sealed this
Tenth Day of October, 2023

Katherine Kelly Vidal
*Director of the United States Patent and Trademark Office*